(12) United States Patent
Kim

(10) Patent No.: US 6,876,357 B2
(45) Date of Patent: Apr. 5, 2005

(54) DRIVING CIRCUIT FOR ORGANIC ELECTROLUMINESCENCE DEVICE

(75) Inventor: Hak Su Kim, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/911,851

(22) Filed: Jul. 25, 2001

(65) Prior Publication Data

US 2002/0015033 A1 Feb. 7, 2002

(30) Foreign Application Priority Data

Jul. 28, 2000 (KR) ........................................ 2000-43711

(51) Int. Cl.[7] ................................................ G09G 3/36
(52) U.S. Cl. ........................................ 345/204; 345/82
(58) Field of Search ............................ 345/82, 87, 204, 345/205, 206, 80

(56) References Cited

U.S. PATENT DOCUMENTS

| | | | | |
|---|---|---|---|---|
| 5,088,017 A | * | 2/1992 | Yaginuma et al. | 363/21.04 |
| 5,489,867 A | * | 2/1996 | Tamanoi | 327/269 |
| 5,532,712 A | * | 7/1996 | Tsuda et al. | 345/87 |
| 6,081,075 A | * | 6/2000 | Littlefield | 315/209 R |
| 6,598,148 B1 | * | 7/2003 | Moore et al. | 712/32 |

* cited by examiner

*Primary Examiner*—Henry N. Tran
*Assistant Examiner*—Jean Lesperance
(74) *Attorney, Agent, or Firm*—Fleshner & Kim, LLP

(57) ABSTRACT

A driving circuit of electroluminescence (EL) display device is disclosed, which is divided into an integrated circuit (IC) and an exterior circuit. The IC includes a DC-DC converter for controlling an external DC voltage to a desired DC voltage through a timing control signal. A power peripheral unit is provided outside the IC, which controls an input voltage and an output voltage of the DC-DC converter and stabilizes the DC-DC converter. The DC-DC converter generates a desired DC voltage using the external input voltage according to a voltage control signal subject to the timing control signal. The generated DC voltage is provided to a data processor and a scan processor inside the IC. It is possible to control the DC voltage inside the IC using the DC-DC converter controlled by the timing control signal, and most parts of a power portion can be integrated inside the IC.

15 Claims, 3 Drawing Sheets

DRIVING CIRCUIT FOR ORGANIC ELECTROLUMINESCENCE DEVICE

BACKGROUND OF THE INVENTION

1. Field of the Invention

The present invention relates to a driving circuit of a display device, and more particularly, to a driving circuit of an organic electroluminescence (EL) device using a DC-DC converter.

2. Background of the Related Art

Recently, a flat display market is rapidly developing.

A flat display, developed beginning with liquid crystal displays (LCD), has received much attention. A cathode ray tube (CRT), which had been generally used in the field of display for several decades, is recently being replaced with flat displays such as Plasma Display Panel (PDP), Visual Fluorescent Display (VFD), Field Emission Display (FED), Light Emitting Diode (LED), and Electro-luminescence (EL).

With development or the flat display, many studies for decreasing a size of Integrated Circuits (IC) used in the flat display and decreasing the number of external parts are in progress.

A power supply is separately formed outside the ICs without being formed inside the ICs for some reasons. Since ICs for power supply, sold in the market, are separately used, several limitations according to miniaturization and low cost occur.

FIG. 1 is a block diagram illustrating a structure of a related art driving circuit for an organic EL device.

As shown in FIG. 1, the related art driving circuit is divided into an internal circuit portion and an external circuit portion.

Referring to FIG. 1, the external circuit portion includes a power supply 10, a power peripheral unit 20, and an external micro control unit (MCU) 90. The power supply 10 supplies the required power to all parts of the organic EL device. The power peripheral unit 20 consists of an inductor, a diode, and a resistor.

Meanwhile, the internal circuit portion includes an interface unit 50 interfacing display information from the MCU 90, a memory 60 storing the display information transmitted through the interface unit 50, a data processor 30 outputting a display data to a display panel 60 using the display information stored in the memory 60 and a direct current (DC) voltage provided from the power supply 10, a scan processor 40 outputting a scan data to the display panel 80, and a timing control unit 70 controlling a whole timing required for the display.

The related art control unit includes most components inside an IC, however, a power portion, i.e., the power supply 10 and the power peripheral unit 20 are provided outside the IC.

As has been explained, the related art driving circuit for an organic EL device should control the DC voltage supplied to the display panel considering several factors such as external voltage fluctuation.

At this time, additional devices or parts are required outside the IC to properly control the DC voltage.

Also, since the power portion is provided outside the IC, hardware required to connect internal components of the IC with the external power portion is additionally required. For this reason, a volume of the organic EL display device increases, thereby causing difficulty in using the driving circuit.

SUMMARY OF THE INVENTION

Accordingly, the present invention is directed to a driving circuit for an organic EL display device that substantially obviates one or more problems due to limitations and disadvantages of the related art.

An object of the present invention is to provide a driving circuit for an organic EL display device that can control a DC voltage inside an IC.

Another object of the present invention is to provide a one-chip driving circuit for an organic EL display device having a power supply inside an IC.

Other object of the present invention is to provide a driving circuit for an organic EL display device that can reduce the size and the cost.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, a driving circuit for an organic EL display device includes a DC-DC converter provided inside one chip, for converting an external DC voltage to a desired DC voltage, the DC-DC converter being controlled by a timing control signal for controlling timing of the organic EL display device.

In one aspect of the present invention, a driving circuit for an organic EL display device includes a DC-DC converter provided inside one chip, for controlling an external voltage input depending on a taming control signal and providing a controlled DC voltage, an interface unit provided inside the chip, for interface with parts outside the chip, a memory provided inside the chip, for storing display information transmitted through the interface unit, a data processor provided inside the chip, for providing a display data to a display panel of the EL display device using the display information stored in the memory and the controlled DC voltage output from the DC-DC converter, a scan processor provided inside the chip, for outputting scan data to the display panel using the display information and the controlled DC voltage output from the DC-DC converter, and a timing control unit provided inside the chip, for providing the timing control signal to the DC-DC converter, the interface unit, the memory, the data processor, and the scan processor.

Preferably, the driving circuit for an organic EL display device further includes a power peripheral unit provided outside the chip, for controlling input and output voltages of the DC-DC converter, preventing a backward current from occurring during the DC-DC conversion, and maintaining the input DC voltage for a predetermined time.

Preferably, the DC-DC converter includes a mode control unit outputting a voltage control signal in response to the timing control signal from the timing control unit, an impedance generating unit outputting an impedance value changed depending on the voltage control signal output from the mode control unit, a resistor connected with an output terminal of the DC-DC converter in parallel and with an output terminal of the impedance generating unit in series, and a voltage control unit receiving a feedback value of the controlled DC voltage distributed by the impedance value output from the impedance generating unit and a value of the resistor, and then outputting a DC voltage controlled according to the feedback voltage.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
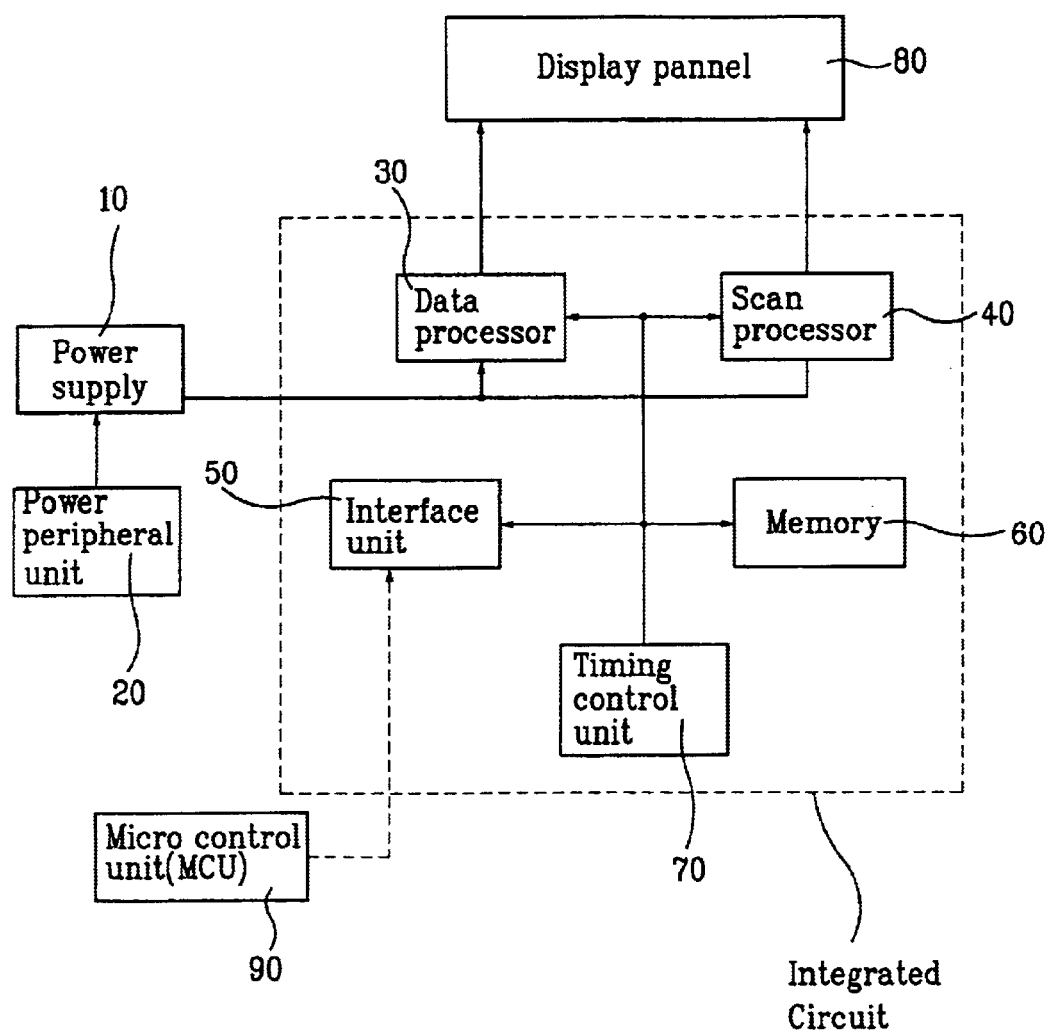
FIG. 1 is a diagram illustrating a structure of a related art driving circuit for an organic EL device.
Figure 2:
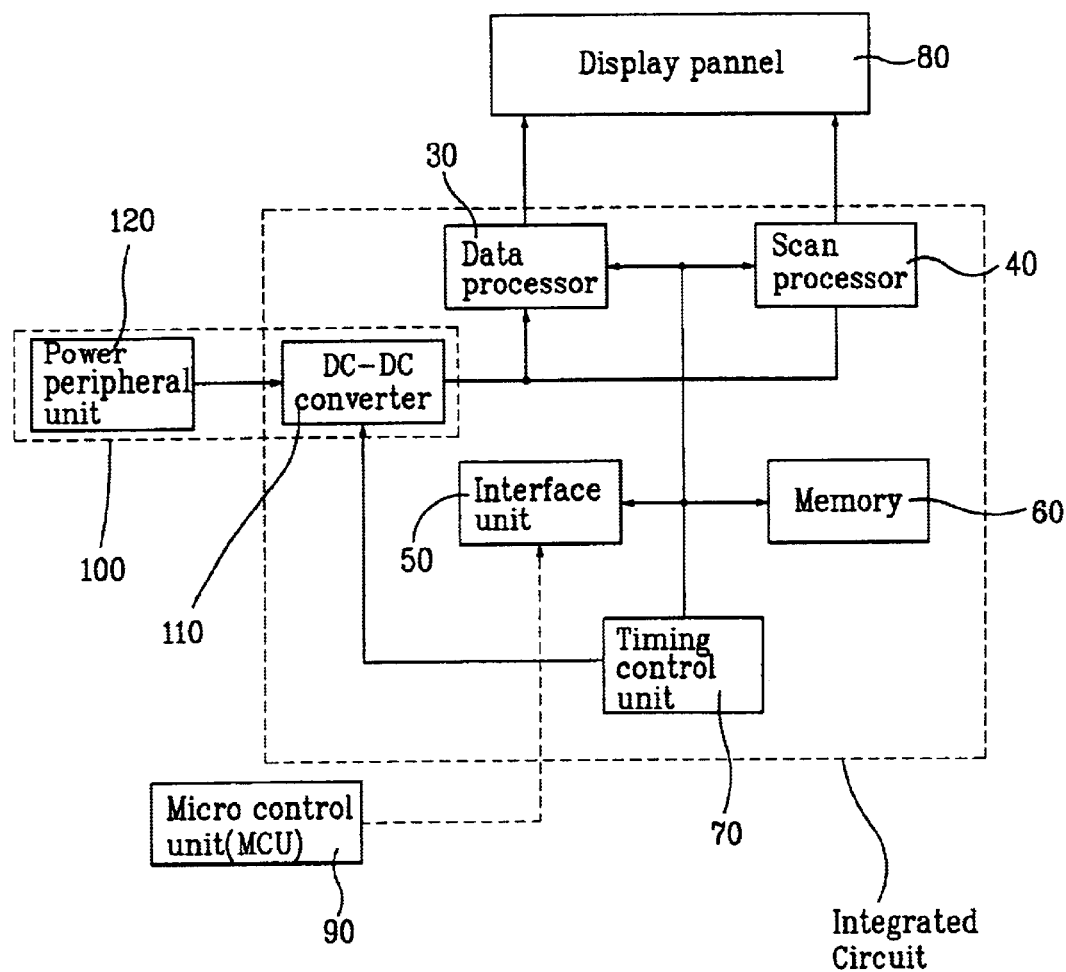
FIG. 2 is a diagram illustrating a structure of a driving circuit for an organic EL device in accordance with the present invention.

FIG. 2 is a block diagram illustrating a structure of a driving circuit for an organic EL device in accordance with the present invention.

Referring to FIG. 2, the driving circuit includes a data processor 30, a scan processor 40, an interface unit 50, a memory 60, a timing control unit 70, and a DC-DC converter 110.

The DC-DC converter 110 is provided inside the driving circuit which is an IC.

Also, the DC-DC converter 110 controls a DC voltage externally provided by timing control signals and provides the controlled DC voltage to the other components inside the driving circuit.

The interface unit 50 interfaces the components of the driving circuit with am external MCU located outside the driving circuit.

The memory 60 stores display information transmitted through the interface unit 50.

The data processor 30 outputs a display data for a display panel 80 using the display information stored in the memory 60 and a predetermined DC voltage output from the DC-DC converter 110.

The scan processor 40 outputs scan signals to the display panel 80 according to the display information from the memory 60.

The timing control signals output from the timing control unit 70 are provided to all components of the one-chip driving circuit. That is, the timing control signals are used as control signals required to provide the display data and the scan data to the display panel 80 and to allow the DC-DC converter 110 to convert the external DC voltage to a desired DC voltage.

Meanwhile, in FIG. 2, the power peripheral unit 120 controls input and output voltages of the DC-DC converter 110 within the one-chip driving circuit.

Also, the power peripheral unit 120 stabilizes the operation of the DC-DC converter 110, which is to prevent backward current from occurring and to maintain the input voltage for a predetermined time.

The power peripheral unit 120 includes an inductor, a diode, and a resistor, which cannot be installed inside the IC, so that those are installed outside the IC.

A structure of the DC-DC converter 110 and the power peripheral unit 120 will be described in detail with reference to FIG. 3.

Figure 3:
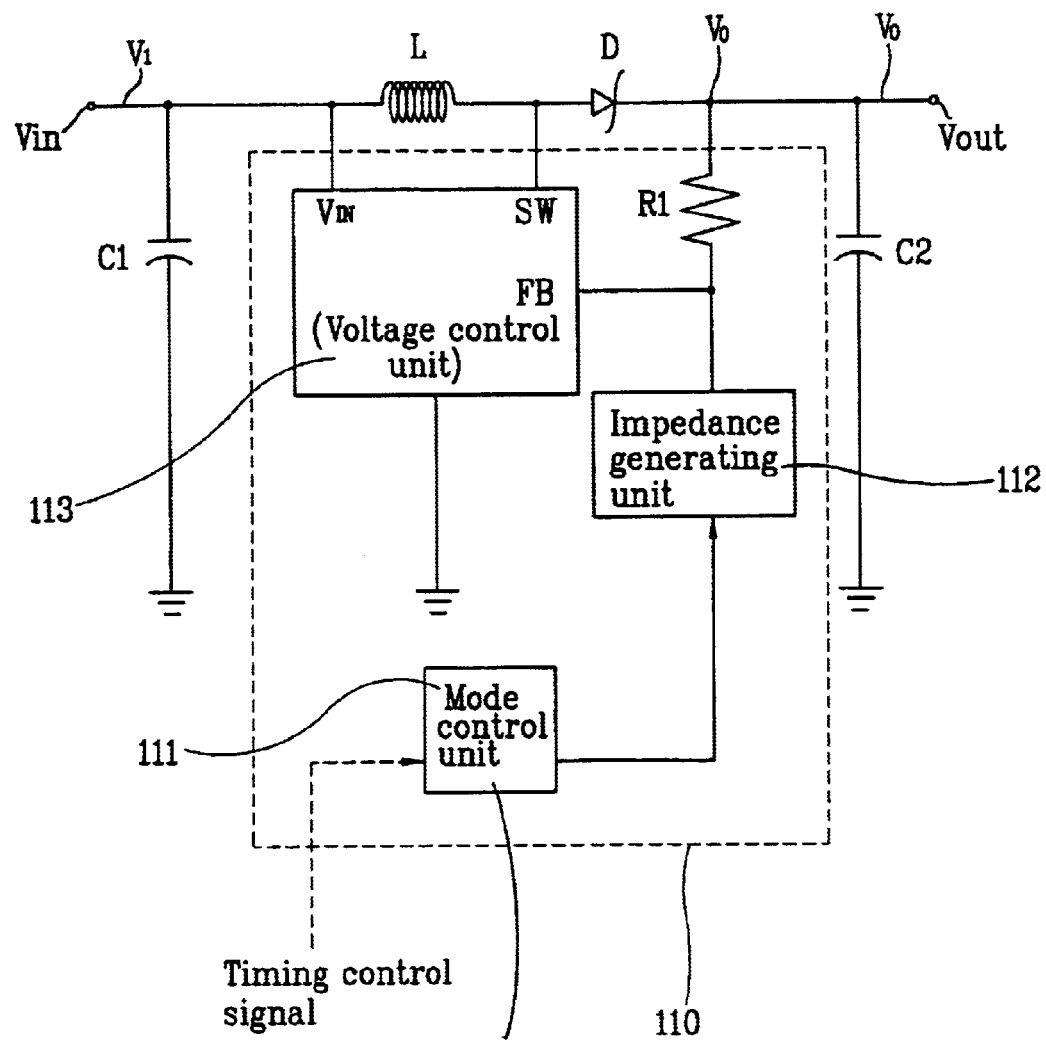
FIG. 3 is a diagram illustrating a structure of a power portion in accordance with the present invention.

FIG. 3 is a detailed block diagram illustrating a circuit of the DC-DC converter 110 and the power peripheral unit 120.

Referring to FIG. 3, the DC-DC converter 110 includes a mode control unit 111, an impedance generating unit 112, a voltage control unit 113; and a resistor R1.

The mode control unit 111 generates a voltage control signal for controlling a constant DC voltage supplied from the power peripheral unit 120 in response to, the timing control signals output from the timing control unit 70.

The impedance generating unit 112 outputs an impedance value properly changed depending on the voltage control signal output from the mode control unit 111.

The voltage control unit 113 inputs an output voltage Vo, distributed in an appropriate proportion according to the changed impedance output from the impedance generating unit 112 and the resistor R1 connected with the impedance generating unit 112 in series, through a feedback terminal FB. The voltage control unit 113 outputs the controlled DC voltage Vo using the input voltage Vi and the feedback voltage.

Meanwhile, in FIG. 3, the impedance generating unit 112 and the resistor R1 may be installed both inside and outside the IC. As shown in FIG. 3, the power peripheral unit 120 for changing the voltage, which in installed outside the IC, is connected with its input terminal Vin and its output terminal Vout in parallel, and includes a first stabilized capacitor C1 and a second stabilization capacitor C2 to minimize fluctuation of the input voltage Vi and the output voltage Vo. It is preferable that the capacitors C1 and C2 have a large capacity as much as possible.

The power peripheral unit 120 includes an inductor L and a diode D. The inductor is connected in series between the input terminal Vin and the output terminal Vout to maintain the input voltage Vi applied to the voltage control unit 113 for a predetermined time to adjust a desired voltage. The diode is connected between the voltage control unit 113 and the output terminal Vout, and prevents a backward current from occurring in the power peripheral unit 120.

As has been explained, the operation of the driving circuit for an organic EL device will be described in detail with reference to FIG. 2 and FIG. 3.

First, the timing control unit 70 provides the timing control signal to the DC-DC converter 110. Then, the mode control unit 112 generates the voltage control signal for converting the external DC voltage from the power peripheral unit 120 to a desired DC voltage value in response to the timing control signal.

That is, the mode control unit 112 generates a voltage control signal corresponding to the timing control signal.

Subsequently, the voltage control signal is transmitted to the impedance generating unit 112. The impedance generating unit transmits an impedance value corresponding to the input voltage control signal to the feedback terminal FB of the voltage control unit 113.

Meanwhile, the voltage control unit 113 internally controls an external DC voltage, which is applied through the input terminal Vin of the power peripheral unit 120, using the impedance input through the feedback terminal FB. Then, the voltage control unit 113 outputs the controlled DC voltage through its output terminal SW. The output DC voltage is output as an output signal of the DC-DC converter 110 through the output terminal Vout in the power peripheral unit 120.

Subsequently, the output signal of the DC-DC converter 110, output through the output terminal Vout, is input to the data processor 30 and the scan processor 40.

Meanwhile, the display information is transmitted from the MCU 90 to the memory 60 through the interface unit 50 and then stored in the memory 60. The display information is input to the data processor 30 and the scan processor 40, together with the controlled DC voltage output from the DC-DC converter 110.

Subsequently, the data processor 30 and the scan processor 40 respectively generate the display data and the scan data based on the display information and the controlled DC voltage output from the DC-DC converter 110 in response to the timing control signal provided from the timing control unit 70. The data processor 30 and the scan processor 40 output the display data and the scan data to the display panel 80.

Accordingly, a character and a video corresponding to the display data and the scan data are displayed on the display panel 80, which have a brightness corresponding to the controlled DC voltage output from the DC-DC converter 110.

As has been explained, the driving circuit for an organic EL device according to the present invention has the following advantages.

First, since the DC-DC converter and the power peripheral unit are installed inside the IC of the driving circuit, parts installed outside the driving circuit decrease. Therefore, the manufacturing cost of the EL display device can be reduced and its volume can be minimized.

Furthermore, voltage control signals for various modes can be generated inside the IC of the driving circuit according to the timing control signal Accordingly, it is possible to obtain the desired DC voltage value with convenience and exactness.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A driving circuit for a display device comprising:
    a DC-DC converter provided inside one chip, for converting an external voltage input depending on a timing control signal and providing a controlled DC voltage;
    an interface unit provided inside the chip, for interface with parts outside the chip;
    a memory provided inside the chip, for storing display information transmitted through the interface unit;
    a data processor provided inside the chip, for providing a display data to a display panel of the display device using the display information stored in the memory and the controlled DC voltage output from the DC-DC converter;
    a scan processor provided inside the chip, for outputting scan data to the display panel using the display information and the controlled DC voltage output from the DC-DC converter;
    a timing control unit provided inside the chip, for providing the timing control signal to the DC-DC converter, the interface unit, the memory, the data processor, and the scan processor; and
    a power peripheral unit provided outside the chip, for controlling input and output voltages of the DC-DC converter, preventing a backward current from occurring during the DC-DC conversion, and maintaining the input DC voltage for a predetermined time, wherein the power peripheral unit comprises:
        an input terminal providing an applying external voltage to the DC-DC converter;
        an output terminal for outputting the controlled DC voltage output from the DC-DC converter to the outside of the chip;
        a first capacitor connected with the input terminal in parallel to reduce fluctuation of the input voltage;
        a second capacitor connected with the output terminal in parallel to reduce fluctuation of the controlled DC voltage;
        an inductor connected in series between the input terminal and the output terminal, for maintaining the external voltage applied to the DC-DC converter for a predetermined time; and
        a diode connected in series between the input terminal and the output terminal, for reducing a backward current from occurring.

2. The driving circuit for a display device as claimed in claim 1, wherein the DC-DC converter controls the external voltage by constructing a feedback circuit that depends on the timing control signal.

3. The driving circuit for a display device as claimed in claim 1, wherein the DC-DC converter comprises a control unit that controls an output voltage of the DC-DC converter provided inside the one chip by using a feedback circuit responsive to the timing control signal.

4. The driving circuit for a display device as claimed in claim 1, wherein the DC-DC converter comprises a voltage control unit that receives a feedback value of the controlled DC voltage distributed by an impedance value and outputs a DC voltage controlled according to the feedback value.

5. The driving circuit for a display device as claimed in claim 1, wherein the controlled DC voltage level is changed by the DC-DC converter provided inside the chip.

6. The driving circuit for a display device as claimed in claim 1, wherein the output voltage of the DC-DC converter is changed by controlling a voltage control signal and a signal of the DC-DC converter.

7. A system for driving a display devices, comprising:
    an integrated circuit (IC), wherein the IC comprises:
        a DC-DC converter for converting a supplied voltage based on a timing control signal and providing a controlled DC voltage;
        a timing control unit for providing the timing control signal to the DC-DC converter;
        a mode control unit outputting a voltage control signal in response to the timing control signal from the timing control unit;
        an impedance generating unit outputting an impedance value changed depending on the voltage control signal output from the mode control unit;
        a resistor connected with an output terminal of the DC-DC converter in parallel and with an output terminal of the impedance generating unit in series; and a voltage control unit receiving a feedback value of the controlled DC voltage distributed by the impedance value output from the impedance generating unit and a value of the resistor, and then outputting a DC voltage controlled according to the feedback voltage.

8. The system as claimed in claim 7, wherein the impedance generating unit and the resistor can be installed not inside the IC but outside the IC.

9. The system of claim 7, further comprising an external power source to be coupled to the IC, for controlling for supplying the supplied voltage.

10. A system for driving a display device comprising an integrated circuit (IC), wherein the IC comprises:
   a DC-DC converter for converting an external voltage input according to a timing control signal and providing a controlled DC voltage, wherein the controlled DC voltage is changed by the DC-DC converter by controlling a load condition of a feedback signal from the controlled DC voltage to the DC-DC converter, and wherein the DC-DC converter comprises:
      a voltage control unit having an input terminal that receives the external voltage, an output terminal, and a feedback terminal; and
      a feedback circuit to couple the output terminal and the feedback terminal, to control the feedback signal according to the timing control signal.

11. The system of claim 10, further comprising a power peripheral unit to be electrically connected to the IC, for providing the external voltage input to the DC-DC converter.

12. A system for driving display device, comprising a DC-DC converter for converting a supplied voltage based on a timing control signal and outputting a controlled DC voltage, wherein the DC-DC converter comprises:
   a voltage control unit having an input terminal that receives the supplied voltage, an output terminal and a feedback terminal; and
   a mode control unit that receives the timing control signal, wherein the controlled DC voltage can be generated by the DC-DC converter for a plurality of modes according to a feedback signal received at the feedback terminal that corresponds to a voltage control signal output by the mode control unit.

13. The system of claim 12, further comprising a peripheral voltage supply unit to provide the supplied voltage to the DC-DC converter.

14. The system of claim 13, wherein the peripheral voltage supply unit controls input and output voltages of the DC-DC converter, prevents a backward current from occurring during DC-DC conversion, and maintains the input DC voltage for a predetermined time.

15. A driving circuit for a display device comprising:
   DC-DC converter means provided inside one chip, for controlling an external voltage input depending on a timing control signal and providing a controlled DC voltage;
   memory means provided inside the chip, for storing display information;
   data processing means provided inside the chip, for providing a display data to a display panel of the display device using the display information stored in the memory means and the controlled DC voltage output from the DC-DC converter means;
   scan processing means provided inside the chip, for outputting scan data to the display panel using the display information and the controlled DC voltage output from the DC-DC converter means; and
   timing means provided inside the chip, for providing the timing control signal to the DC-DC converter means, the memory means, the data processing means, and the scan processing means, wherein the DC-DC converter means comprises,
   mode control means for outputting a voltage control signal in response to the timing control signal from the timing means,
   resistance means coupled to an output terminal of the DC-DC converter for distributing the controlled DC voltage, and
   voltage control means for receiving a feedback voltage of the controlled DC voltage distributed by the resistance means responsive to the voltage control signal of the mode control means, and then outputting the DC voltage controlled according to the feedback voltage.

* * * * *